United States Patent [19]
Broemer et al.

[11] 3,836,375
[45] Sept. 17, 1974

[54] $TiO_2$—$P_2O_5$—$Na_2O$—$WO_3$ OPTICAL GLASSES AND METHOD

[75] Inventors: Heinz Broemer, Hermannstein; Werner Huber, Steindorf; Norbert Meinert; Johann Spincic, both of Wetzlar, all of Germany

[73] Assignee: Ernst Leitz GmbH, Wetzlar, Germany

[22] Filed: Mar. 26, 1973

[21] Appl. No.: 344,578

[52] U.S. Cl. .............................. 106/47 Q, 65/134
[51] Int. Cl. ........................... C03c 3/16, C03c 3/30
[58] Field of Search ............... 106/47 Q, 47 R, 54; 65/134

[56] References Cited
UNITED STATES PATENTS

| | | | |
|---|---|---|---|
| 2,518,194 | 8/1950 | Silverman et al. | 106/47 Q |
| 3,278,318 | 10/1966 | Hensler et al. | 106/47 Q |
| 3,446,638 | 5/1969 | Bromer et al. | 106/54 |
| 3,490,928 | 1/1970 | Brewster et al. | 106/47 Q |

FOREIGN PATENTS OR APPLICATIONS

| | | | |
|---|---|---|---|
| 46-3462 | 1971 | Japan | 106/47 Q |

*Primary Examiner*—Helen M. McCarthy
*Attorney, Agent, or Firm*—Erich M. H. Radde

[57] ABSTRACT

Optical glasses of a high index of refraction $n_e$ between 1.74 and 1.90, a high dispersion $\nu_e$ between 25 and 17, and a high positive anomalous partial dispersion are prepared. The essential components of the melt mixture are phosphorus compounds, sodium oxide, titanium dioxide, and tungsten oxide. If desired, said essential components have admixed thereto other glass-forming oxides and phosphates.

10 Claims, 1 Drawing Figure

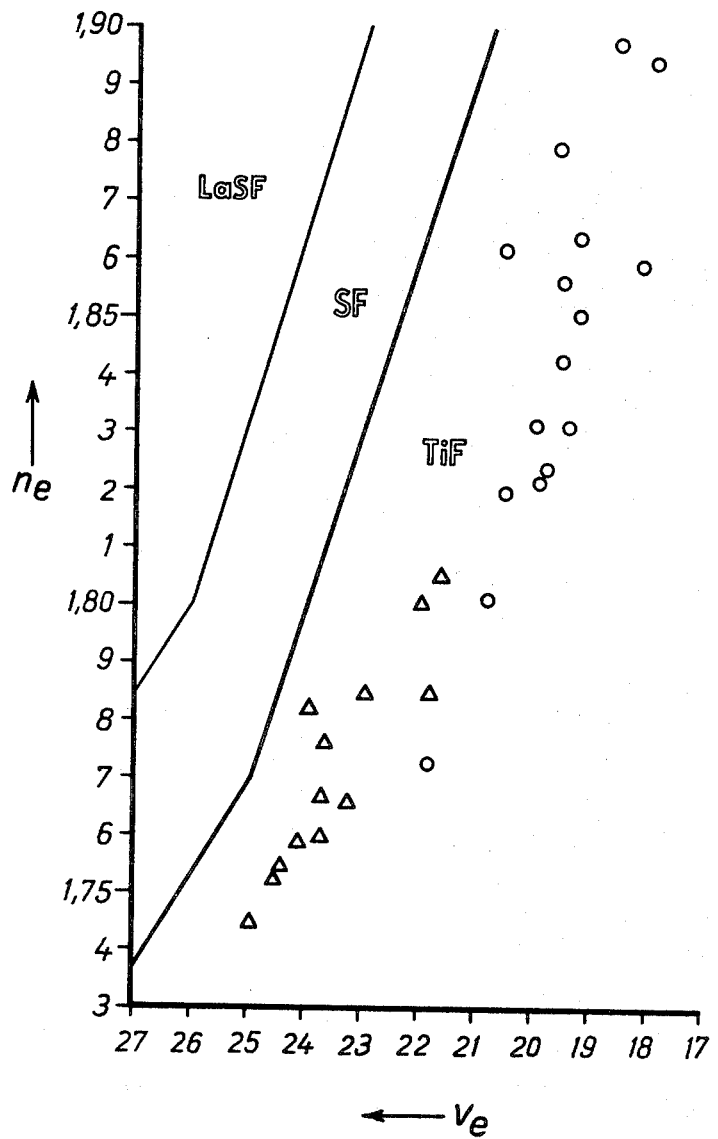

TiO₂–P₂O₅–Na₂O–WO₃ OPTICAL GLASSES AND METHOD

BACKGROUND OF THE INVENTION

1. Field of the Invention

The present invention relates to an improved optical glass and more particularly to an optical glass of high index of refraction, high dispersion, and high positive anomalous partial dispersion as well as to a method for the manufacture thereof, and to optical systems containing such a glass.

2. Description of the Prior Art

It is known to produce a glass which contains relatively small amounts of lanthanum oxide and tantalum pentoxide, namely 23.3 percent, by weight, of lanthanum oxide $La_2O_3$ and 3.0 percent, by weight, of tantalum pentoxide $Ta_2O_5$, and other glass components. Such a glass has an $\nu_d$-value of 32.9 corresponding to a $\nu_e$-value of about 32.6 on account of its relatively low lanthanum oxide and tantalum pentoxide content. Such glasses are considerably less expensive than glasses of a high lanthanum content.

There are also known silicate glasses with a high lead content, namely a lead monoxide content exceeding 50 percent by weight. Such glasses have a high specific gravity (g./cc.). Therefore, optical systems comprising such glasses are relatively heavy.

SUMMARY OF THE INVENTION

It is one object of the present invention to provide optical glasses of high index of refraction, high dispersion, and high positive anomalous partial dispersion which have a substantially lower specific gravity than the known glasses of similar optical characteristics.

Another object of the present invention is to provide a simple and effective process of producing such optical glasses.

Still another object of the present invention is to provide optical systems which contain at least one of the optical glasses with the aforesaid properties and especially a glass of a remarkably high positive anomalous partial dispersion, such high-grade composite optical systems representing a noteworthy advance in this art because they permit to produce achromatic optical systems with high aperture ratio which can easily be corrected with respect to the spherical error or aberration.

Other objects of the present invention and advantageous features thereof will become apparent as the description proceeds.

In principle the optical glass according to the present invention contains the following components, indicated in percent by weight:

22.2 to 38.7 percent of phosphorus pentoxide ($P_2O_5$),
4.7 to 19.5 percent of sodium oxide ($Na_2O$),
10.0 to 30.0 percent of titanium dioxide ($TiO_2$), and
12.5 to 30.0 percent of tungsten trioxide ($WO_3$).

In accordance with another embodiment of this invention, the glass may in addition contain at least one of the following components, indicated in percent by weight:

Up to 5.2 percent of lithium oxide ($Li_2O$),
up to 10.4 percent of potassium oxide ($K_2O$),
up to 6.6 percent of magnesium oxide ($MgO$),
up to 11.3 percent of calcium oxide ($CaO$),
up to 15.6 percent of barium oxide ($BaO$),
up to 12.2 percent of lead monoxide ($PbO$),
up to 7.8 percent of boron trioxide ($B_2O_3$),
up to 1.9 percent of aluminum oxide ($Al_2O_3$), and
up to 21.0 percent of niobium pentoxide ($Nb_2O_5$).

A glass in accordance with the present invention can preferably be obtained by melting down a mixture which consists of the following components indicated in percent by weight:

35.0 to 50.0 percent of sodium metaphosphate ($NaPO_3$),
up to 15.0 percent of sodium pyrophosphate ($Na_4P_2O_7$),
20.0 to 30.0 percent of titanium dioxide ($TiO_2$), and
20.0 to 30.0 percent of tungsten trioxide ($WO_3$).

In accordance with a further embodiment of the present invention, the mixture to be melted down can also consist of the following components, indicated in percent by weight:

10.0 to 50.0 percent of an alkali metal phosphate compound such as an alkali metal metaphosphate and/or sodium pyrophosphate ($Na_4P_2O_7$), whereof between 0 and 50 percent are alkali metal metaphosphates ($MePO_3$) such as lithium metaphosphate ($LiPO_3$) and/or sodium metaphosphate ($NaPO_3$) or potassium metaphosphate ($KPO_3$), and between 0 and 16 percent are sodium pyrophosphate ($Na_4P_2O_7$),
10.0 to 30.0 percent of titanium dioxide ($TiO_2$),
12.5 to 30.0 percent of tungsten trioxide ($WO_3$) or sodium tungstate ($Na_2WO_4$), whereby the content of sodium tungstate ($Na_2WO_4$) can be up to 26.3 percent;
up to 40.0 percent of the metaphosphates of magnesium, calcium, or barium, the content of magnesium metaphosphate ($Mg(PO_3)_2$) or barium metaphosphate ($Ba(PO_3)_2$), respectively, being each up to 30.0 percent;
up to 10.0 percent of aluminum metaphosphate ($Al(PO_3)_3$);
up to 20.0 percent of lead metaphosphate ($Pb(PO_3)_2$);
up to 5.0 percent of lead monoxide ($PbO$);
up to 21.0 percent of niobium pentoxide ($Nb_2O_5$);
up to 5.7 percent of boron trioxide ($B_2O_3$); and/or
up to 12.0 percent of sodium metaborate ($NaBO_2$).

As stated above, such glasses according to the present invention have the advantage that they have a substantially lower density than known glasses of similar optical characteristics.

The optical glasses according to the present invention are of extreme importance for the optical designer since they enable him to produce in combination with other high-refractive glasses, achromatic optical systems with high aperture ratio which can readily be corrected with respect to spherical defects.

The reason for this possibility of correction is that a high ratio of the two Abbe numbers $\nu_1$ and $\nu_2$ is highly relevant in geometrical optical systems. If, as the examples according to the present invention show, a glass with an Abbe number of $\nu_2 = 20$ is used and the ratio of $\nu_1 : \nu_2$ is fixed at 1.6 to 1.8, the second glass can have a $\nu_1$-value between 32 and 36.

Attached Table 1 gives comparative data of a few types of glass in accordance with the present invention with certain known glasses of comparable optical characteristics. These known glasses are silicate glasses of a high lead content, i.e., a lead monoxide content exceeding 50 percent, by weight, as they are produced by Jenaer Glaswerke Schott and Gen. of Mainz, West Germany.

Table 1 shows that the glasses according to the present invention are considerably lighter than the known commercial glasses. The use of the new glasses in optical systems, therefore, is accompanied by further economic advantages due to a considerable saving in weight.

A particular advantage of the new glasses is the partly very high positive anomalous partial dispersion. Since it has been known for a long time that diminution of the so-called "secondary spectrum" in high-grade objectives is possible only if at least one of the glasses used has an anomalous partial dispersion, further advantages with respect to possible correction of high-grade composite optical systems can be achieved by the use of the glasses of this invention.

In attached Table 2 there is listed the composition of mixtures of glass components from which glasses according to the present invention can be produced by melting. In addition to alkali metal and alkaline earth metal metaphosphates and sodium pyrophosphate, 50 percent, by weight, of titanium dioxide ($TiO_2$) and tungsten trioxide ($WO_3$) are used in each example. The examples are arranged in Table 2 in accordance with their increasing index of refraction.

In attached Table 3 the melts of Table 2 are given calculated as oxides.

In attached Table 4 there is listed the composition of mixtures of glass components which, in addition to alkali metaphosphates and sodium pyrophosphate, contain considerable amounts of titanium dioxide, niobium pentoxide, and tungsten oxide or an alkali metal tungstate such as sodium tungstate. Surprisingly it was found that titanium dioxide ($TiO_2$) can be used without any disadvantageous effect in an amount up to 30 percent, by weight. Such high amounts of titanium dioxide do not cause devitrification and strong coloring of the glass obtained therewith.

The proportions of titanium dioxide ($TiO_2$) and niobium pentoxide ($Nb_2O_5$) and, if desired, tungsten trioxide ($WO_3$) are between 29 and 52 percent, by weight.

It has been found that glasses melted down from these batches can further be improved considerably if, in addition to a high titanium dioxide ($TiO_2$) content, at the same time tungsten compounds, such as tungsten trioxide ($WO_3$) or sodium tungstate ($Na_2WO_4$) or niobium pentoxide ($Nb_2O_5$) are added to the mixture.

The melts of Table 4 are given calculated as oxides in attached Table 5.

The mixtures set forth in Tables 2 and 4 can have added thereto 1 to 2 percent, by weight, of potassium meta-arsenate ($KAsO_3$). The examples in these Tables show which variations of the optical characteristics can be achieved within the range of composition of the mixtures as given.

In the attached graph there is plotted a section of the $n_e$-$\nu_e$ diagram. The melt examples as given in Table 2 are indicated in said graph by circles and the melt examples as given in Table 4 by triangles. As can be seen, all the examples shown in the graph are located in the so-called "deep flint" (TiF = "Tiefflint") region.

Melts of the compositions according to the present invention are produced as follows:

Phosphoric acid is introduced into the melt charge preferably in the form of metaphosphates or pyrophosphates. Tungsten is added in the form of its oxide or as tungstate and boron is supplied in the form of boric acid or as metaborate.

The chemicals thus weighed in, for instance, in a total amount of 1 kg., are carefully mixed and then placed in portions into a platinum crucible which is heated preferably by induction.

It is understood that careful attention is to be paid to maintaining an optimum ratio of volume of molten material to its surface in the melts in order to keep the melting loss within narrow limits.

Preferably the optimum proportion of the height of the melt charge designated as H and the diameter of the crucible designated as D is H : D ≈ 3 : 1 although, of course, other proportions may also be used. Furthermore a reducing atmosphere is to be avoided. Melting in an oxidizing atmosphere is the preferred procedure.

The molten mixture is refined by briefly increasing the temperature to 1,300° C. The melt is then homogenized at a temperature of 1,200° C. with continual agitation at not too high a speed. After a melting time of about two hours, the temperature is decreased to the casting temperature of 800° C.

The melt is then cast into preheated carbon molds and is cooled to room temperature in suitable furnaces.

Of course, many changes and variations in the components of the glass melts, in the amounts of said components in the melt, in the manner in which the glass is produced, in the melting and cooling temperature and duration, and the like may be made by those skilled in the art in accordance with the principles set forth herein and in the claims annexed hereto.

TABLE 1

| No. of melt | Glasses according to the invention | | | Known glasses | | |
|---|---|---|---|---|---|---|
| | $n_e$ | $\nu_e$ | specific gravity (g./cc.) | $n_e$ | $\nu_e$ | specific gravity (g./cc.) |
| 382 | 1.7447 | 24.9 | 3.53 | 1.7470 | 27.9 | 4.56 |
| 357 | 1.8012 | 20.8 | 3.33 | 1.7918 | 15.8 | 4.92 |
| 376 | 1.8051 | 21.6 | 2.87 | 1.7919 | 25.6 | 4.74 |
| 366 | 1.8191 | 20.4 | 3.29 | 1.8126 | 25.2 | 5.18 |
| 323 | 1.8640 | 19.2 | 3.43 | 1.8550 | 23.6 | 5.51 |
| 325 | 1.8975 | 18.5 | 3.72 | 1.9276 | 21.3 | 5.95 |

TABLE 2 (in percent by weight)

| No. of melt | 358 | 357 | 397 | 314 | 339 | 308 | 331 | 310 |
|---|---|---|---|---|---|---|---|---|
| $LiPO_3$ | — | — | 10.0 | — | — | — | — | 10.0 |
| $NaPO_3$ | 35.0 | 35.0 | 30.0 | 40.0 | 30.0 | 50.0 | 30.0 | 40.0 |
| $KPO_3$ | — | — | — | — | — | — | — | — |
| $Na_4P_2O_7$ | 15.0 | 15.0 | 10.0 | 10.0 | 10.0 | — | 10.0 | — |
| $Mg(PO_3)_2$ | — | — | — | — | — | — | — | — |

TABLE 2 (in percent by weight) — Continued

| No. of melt | 358 | 357 | 397 | 314 | 339 | 308 | 331 | 310 |
|---|---|---|---|---|---|---|---|---|
| Ca(PO₃)₂ | — | — | — | — | — | — | 10.0 | — |
| Ba(PO₃)₂ | — | — | — | — | — | — | — | — |
| Al(PO₃)₃ | — | — | — | — | 10.0 | — | — | — |
| Pb(PO₃)₂ | — | — | — | — | — | — | — | — |
| TiO₂ | 20.0 | 30.0 | 30.0 | 30.0 | 30.0 | 30.0 | 30.0 | 30.0 |
| WO₃ | 30.0 | 20.0 | 20.0 | 20.0 | 20.0 | 20.0 | 20.0 | 20.0 |
| $n_e$ | 1.7730 | 1.8012 | 1.8206 | 1.8219 | 1.8243 | 1.8312 | 1.8315 | 1.8430 |
| $\nu_e$ | 21.8 | 20.8 | 20.5 | 19.9 | 19.8 | 19.4 | 20.0 | 19.5 |
| $\Delta\nu_e$ | +19.4 | +18.7 | +14.6 | — | +12.0 | — | +12.6 | +8.9 |

| No. of melt | 321 | 390 | 324 | 334 | 323 | 337 | 313 | 325 |
|---|---|---|---|---|---|---|---|---|
| LiPO₃ | — | 30.0 | — | — | — | — | — | — |
| NaPO₃ | 30.0 | 20.0 | 30.0 | — | 10.0 | 10.0 | 40.0 | 20.0 |
| KPO₃ | — | — | — | — | — | — | — | — |
| Na₄P₂O₇ | 10.0 | — | 10.0 | 10.0 | 10.0 | 10.0 | — | 10.0 |
| Mg(PO₃)₂ | 10.0 | — | — | — | 30.0 | — | — | — |
| Ca(PO₃)₂ | — | — | — | 40.0 | — | — | — | — |
| Ba(PO₃)₂ | — | — | — | — | — | 30.0 | — | — |
| Al(PO₃)₃ | — | — | — | — | — | — | — | — |
| Pb(PO₃)₂ | — | — | 10.0 | — | — | — | — | 20.0 |
| TiO₂ | 30.0 | 30.0 | 30.0 | 30.0 | 30.0 | 30.0 | 30.0 | 30.0 |
| WO₃ | 20.0 | 20.0 | 20.0 | 20.0 | 20.0 | 20.0 | 30.0 | 20.0 |
| $n_e$ | 1.8504 | 1.8562 | 1.8591 | 1.8620 | 1.8640 | 1.8797 | 1.8942 | 1.8975 |
| $\nu_e$ | 19.2 | 19.5 | 18.1 | 20.5 | 19.2 | 19.6 | 17.9 | 18.5 |
| $\Delta\nu_e$ | +9.2 | — | — | — | — | +9.0 | — | — |

Table 3 (in percent by weight)

| No. of melt | 358 | 357 | 397 | 314 | 339 | 308 | 331 | 310 |
|---|---|---|---|---|---|---|---|---|
| P₂O₅ | 32.3 | 32.3 | 34.5 | 33.1 | 34.3 | 34.7 | 33.4 | 36.1 |
| Li₂O | — | — | 1.7 | — | — | — | — | 1.7 |
| Na₂O | 17.7 | 17.7 | 13.8 | 16.9 | 13.8 | 15.3 | 13.8 | 12.2 |
| MgO | — | — | — | — | — | — | — | — |
| CaO | — | — | — | — | — | — | 2.8 | — |
| BaO | — | — | — | — | — | — | — | — |
| PbO | — | — | — | — | — | — | — | — |
| Al₂O₃ | — | — | — | — | 1.9 | — | — | — |
| TiO₂ | 20.0 | 30.0 | 30.0 | 30.0 | 30.0 | 30.0 | 30.0 | 30.0 |
| WO₃ | 30.0 | 20.0 | 20.0 | 20.0 | 20.0 | 20.0 | 20.0 | 20.0 |

| No. of melt | 321 | 390 | 324 | 334 | 323 | 337 | 313 | 325 |
|---|---|---|---|---|---|---|---|---|
| P₂O₅ | 34.0 | 38.7 | 30.1 | 34.0 | 35.7 | 26.7 | 27.8 | 27.0 |
| Li₂O | — | 5.2 | — | — | — | — | — | — |
| Na₂O | 13.8 | 6.1 | 13.8 | 4.7 | 7.7 | 7.7 | 12.2 | 10.8 |
| MgO | 2.2 | — | — | — | 6.6 | — | — | — |
| CaO | — | — | — | 11.3 | — | — | — | — |
| BaO | — | — | — | — | — | 15.6 | — | — |
| PbO | — | — | 6.1 | — | — | — | — | 12.2 |
| Al₂O₃ | — | — | — | — | — | — | — | — |
| TiO₂ | 30.0 | 30.0 | 30.0 | 30.0 | 30.0 | 30.0 | 30.0 | 30.0 |
| WO₃ | 20.0 | 20.0 | 20.0 | 20.0 | 20.0 | 20.0 | 30.0 | 20.0 |

Table 4 (in percent by weight)

| No. of melt | 382 | 402 | 401 | 400 | 383 | 364 | 410 |
|---|---|---|---|---|---|---|---|
| NaPO₃ | 35.0 | 26.0 | 26.0 | 26.0 | — | 35.0 | 24.0 |
| KPO₃ | — | — | — | — | 26.0 | — | — |
| Na₄P₂O₇ | 15.0 | 13.0 | 12.0 | 13.0 | 13.0 | 15.0 | 13.0 |
| B₂O₃ | — | 5.7 | — | 5.7 | 5.7 | — | 5.7 |
| NaBO₂ | — | — | 12.0 | — | — | — | 2.0 |
| PbO | 5.0 | — | — | — | — | — | — |
| TiO₂ | 10.0 | 14.0 | 15.0 | 15.0 | 15.0 | 15.0 | 15.0 |
| Nb₂O₅ | 15.0 | 15.0 | 15.0 | 15.0 | 15.0 | 15.0 | 18.0 |
| WO₃ | 20.0 | — | 20.0 | — | — | 20.0 | — |
| Na₂WO₄ | — | 26.3 | — | 25.3 | 25.3 | — | 22.3 |
| $n_e$ | 1.7447 | 1.7525 | 1.7543 | 1.7588 | 1.7593 | 1.7656 | 1.7668 |
| $\nu_e$ | 24.9 | 24.5 | 24.4 | 24.1 | 23.7 | 23.2 | 23.8 |
| $\Delta\nu_e$ | +14.7 | +16.0 | +22.0 | +15.9 | +17.4 | +19.3 | +15.6 |

| No. of melt | 415 | 393 | 363 | 392 | 387 | 376 | 366 |
|---|---|---|---|---|---|---|---|
| NaPO₃ | 22.0 | 24.0 | 35.0 | 26.0 | 30.0 | 29.0 | 35.0 |
| KPO₃ | — | — | — | — | — | — | — |
| Na₄P₂O₇ | 13.0 | 15.0 | 15.0 | 15.0 | 15.0 | 16.0 | 15.0 |
| B₂O₃ | 5.7 | — | — | — | 3.0 | 3.0 | — |
| NaBO₂ | 4.0 | 11.0 | — | 9.0 | — | — | — |
| PbO | — | — | — | — | 5.0 | — | — |
| TiO₂ | 15.0 | 15.0 | 20.0 | 15.0 | 19.5 | 19.5 | 30.0 |
| Nb₂O₅ | 21.0 | 15.0 | 10.0 | 15.0 | 10.0 | 15.0 | 7.5 |
| WO₃ | — | 20.0 | 20.0 | 20.0 | 17.5 | 17.5 | 12.5 |
| Na₂WO₄ | 19.3 | — | — | — | — | — | — |
| $n_e$ | 1.7760 | 1.7820 | 1.7843 | 1.7848 | 1.8002 | 1.8051 | 1.8191 |
| $\nu_e$ | 23.6 | 23.9 | 21.8 | 22.9 | 21.9 | 21.6 | 20.4 |
| $\Delta\nu_e$ | +15.4 | +23.1 | +22.7 | +18.9 | +20.9 | +21.5 | +15.2 |

Table 5 (in percent by weight)

| No. of melt | 382 | 402 | 401 | 400 | 383 | 364 | 410 |
|---|---|---|---|---|---|---|---|
| $P_2O_5$ | 32.3 | 25.0 | 24.5 | 25.0 | 22.5 | 32.3 | 23.6 |
| $B_2O_3$ | — | 5.7 | 6.4 | 5.7 | 5.7 | — | 6.8 |
| $Na_2O$ | 17.7 | 19.5 | 19.1 | 19.3 | 11.4 | 17.7 | 19.0 |
| $K_2O$ | — | — | — | — | 10.4 | — | — |
| PbO | 5.0 | — | — | — | — | — | — |
| $TiO_2$ | 10.0 | 14.0 | 15.0 | 15.0 | 15.0 | 15.0 | 15.0 |
| $Nb_2O_5$ | 15.0 | 15.0 | 15.0 | 15.0 | 15.0 | 15.0 | 18.0 |
| $WO_3$ | 20.0 | 20.8 | 20.0 | 20.0 | 20.0 | 20.0 | 17.6 |

| No. of melt | 415 | 393 | 363 | 392 | 387 | 376 | 366 |
|---|---|---|---|---|---|---|---|
| $P_2O_5$ | 22.2 | 24.7 | 32.3 | 26.1 | 28.9 | 28.7 | 32.3 |
| $B_2O_3$ | 7.8 | 5.8 | — | 4.8 | 3.0 | 3.0 | — |
| $Na_2O$ | 18.8 | 19.5 | 17.7 | 19.1 | 16.1 | 16.3 | 17.7 |
| $K_2O$ | — | — | — | — | — | — | — |
| PbO | — | — | — | — | 5.0 | — | — |
| $TiO_2$ | 15.0 | 15.0 | 20.0 | 15.0 | 19.5 | 19.5 | 30.0 |
| $Nb_2O_5$ | 21.0 | 15.0 | 10.0 | 15.0 | 10.0 | 15.0 | 7.5 |
| $WO_3$ | 15.2 | 20.0 | 20.0 | 20.0 | 17.5 | 17.5 | 12.5 |

We claim:

1. An optical glass of high index of refraction $n_e$ between 1.74 and 1.90, high dispersion $\nu_e$ between 25 and 17, and high positive anomalous partial dispersion, said glass containing the following essential components:
   22.2 to 38.7 percent, by weight, of phosphorus pentoxide,
   4.7 to 19.5 percent, by weight, of sodium oxide,
   10.0 to 30.0 percent, by weight, of titanium dioxide, and
   12.5 to 30.0 percent, by weight, of tungsten trioxide.

2. The optical glass of claim 1 additionally containing at least one of the following components:
   0 to 5.2 percent, by weight, of lithium oxide,
   0 to 10.4 percent, by weight, of potassium oxide,
   0 to 6.6 percent, by weight, of magnesium oxide,
   0 to 11.3 percent, by weight, of calcium oxide,
   0 to 15.6 percent, by weight, of barium oxide,
   0 to 12.2 percent, by weight of lead monoxide,
   0 to 7.8 percent, by weight, of boron trioxide,
   0 to 1.9 percent, by weight, of aluminum oxide,
   0 to 21.0 percent, by weight, of niobium pentoxide.

3. The optical glass of claim 1 being composed of
   32.3 percent, by weight, of phosphorus pentoxide,
   17.7 percent, by weight, of sodium oxide,
   30.0 percent, by weight, of titanium dioxide, and
   20.0 percent, by weight, of tungsten oxide,
said glass having an $n_e$ of 1.8012, a $\nu_e$ of 20.8, a $\Delta\nu_e$ of +18.7, a specific gravity of 3.33 g./cc.

4. The optical glass of claim 1 being composed of
   32.3 percent, by weight, of phosphorus pentoxide,
   17.7 percent, by weight, of sodium oxide,
   5.0 percent, by weight, of lead monoxide,
   10.0 percent, by weight, of titanium dioxide,
   15.0 percent, by weight, of niobium pentoxide,
   20.0 percent, by weight, of tungsten trioxide,
$n_e$: 1.7447
$\nu_e$: 24.9
$\Delta\nu_e$: + 14.7
specific gravity: 3.53 g./cc.

5. The optical glass of claim 1 being composed of
   28.7 percent, by weight, of phosphorus pentoxide,
   3.0 percent, by weight, of boron trioxide,
   16.3 percent, by weight, of sodium oxide,
   19.5 percent, by weight, of titanium dioxide,
   15.0 percent, by weight, of niobium pentoxide,
   17.5 percent, by weight, of tungsten trioxide,
$n_e$: 1.8051
$\nu_e$: 21.6
$\Delta\nu_e$: + 21.5
specific gravity: 2.87 g./cc.

6. The optical glass of claim 1 being composed of
   32.3 percent, by weight, of phosphorus pentoxide,
   17.7 percent, by weight, of sodium oxide,
   30.0 percent, by weight, of titanium dioxide,
   7.5 percent, by weight, of niobium pentoxide,
   12.5 percent, by weight, of tungsten trioxide,
$n_e$: 1.8191
$\nu_e$: 20.4
$\Delta\nu_e$: + 15.2
specific gravity: 3.29 g./cc.

7. The optical glass of claim 1 being composed of
   35.7 percent, by weight, of phosphorus pentoxide,
   7.7 percent, by weight, of sodium oxide,
   6.6 percent, by weight, of magnesium oxide,
   30.0 percent, by weight, of titanium dioxide,
   20.0 percent, by weight, of tungsten trioxide,
$n_e$: 1.8640
$\nu_e$: 19.2
specific gravity: 3.43 g./cc.

8. The optical glass of claim 1 being composed of
   27.0 percent, by weight, of phosphorus pentoxide,
   10.8 percent, by weight, of sodium oxide,
   12.2 percent, by weight, of lead monoxide,
   30.0 percent, by weight, of titanium dioxide,
   20.0 percent, by weight, of tungsten trioxide,
$n_e$: 1.8975
$\nu_e$: 18.5
specific gravity: 3.72 g./cc.

9. In a process of producing an optical glass of high index of refraction $n_e$ between 1.74 and 1.90, high dispersion $\nu_e$ between 25 and 17, and high positive anomalous partial dispersion, said process comprising the step of melting a mixture of glass components consisting of
   between 35.0 and 50.0 percent, by weight, of sodium metaphosphate,
   between 0 and 15.0 percent, by weight, of sodium pyrophosphate,
   between 20.0 and 30.0 percent, by weight, of titanium dioxide, and
   between 20.0 and 30.0 percent, by weight, of tungsten trioxide
at a temperature between about 1,200° C. and about 1,300° C., while stirring, to form a glass melt of the above given composition.

10. In a process of producing an optical glass of high index of refraction $n_e$ between 1.74 and 1.90, high dispersion $\nu_e$ between 25 and 17, and high positive anomalous partial dispersion, said process comprising the step of melting a mixture of glass components consisting of between 10.0 and 50.0 percent, by weight, at least one of an alkali metal phosphate compound selected from the group consisting an alkali metal metaphosphate and an alkali metal pyrophosphate with the proviso that the content of lithium metaphosphate, sodium metaphosphate, or potassium metaphosphate is between 0 and 50 percent, by weight;

between 10.0 and 30.0 percent, by weight, of titanium dioxide;

between 12.5 and 30.0 percent, by weight, of a tungsten compound selected from the group consisting of tungsten trioxide and sodium tungstate with the proviso that the content of sodium tungstate is between 12.5 and 26.3 percent, by weight;

between 0 and 40.0 percent, by weight, of a metaphosphate selected from the group consisting of magnesium metaphosphate, calcium metaphosphate, and barium metaphosphate with the proviso that the content of magnesium metaphosphate or barium metaphosphate is between 0 and 30 percent, by weight;

between 0 and 10.0 percent, by weight, of aluminum metaphosphate;

between 0 and 20.0 percent, by weight, of lead metaphosphate;

between 0 and 5.0 percent, by weight, of lead monoxide;

between 0 and 21.0 percent, by weight, of niobium pentoxide;

between 0 and 5.7 percent, by weight, of boron trioxide; and between 0 and 12.0 percent, by weight, of sodium metaborate at a temperature between about 1,200° C. and about 1,300° C., while stirring, to form a glass melt of the above given composition.

* * * * *